United States Patent [19]

Watson

[11] 4,444,031

[45] Apr. 24, 1984

[54] SECURITY DEVICE FOR TACKLE BOXES AND THE LIKE

[76] Inventor: Glen A. Watson, 1530 Maple Rd., Rogers, Ark. 72756

[21] Appl. No.: 292,667

[22] Filed: Aug. 13, 1981

[51] Int. Cl.$^3$ ............................................. F16B 41/00
[52] U.S. Cl. ........................................ 70/232; 70/63; 70/DIG. 57
[58] Field of Search ........... 70/63, 229, 232, DIG. 57; 248/551, 552, 553; 211/4

[56] References Cited

U.S. PATENT DOCUMENTS

| | | | |
|---|---|---|---|
| 3,637,180 | 1/1972 | Parry | 70/232 |
| 4,094,173 | 6/1978 | Brown | 70/232 |
| 4,248,067 | 2/1981 | Sears | 70/63 |

Primary Examiner—Robert L. Wolfe
Attorney, Agent, or Firm—Mead, Johnson & Stevenson

[57] ABSTRACT

A security device for tackle boxes and the like which requires little alteration of the tackle box or item being secured thereby for substantially precluding theft of the item. The device comprises a sleeve member open at one end and closed at the opposite end, with the closed end being secured to the bottom of a boat, floor or other substantially permanent support structure for receiving the tackle box, or the like, thereon. The sleeve member extends through an aperture provided in the bottom of the tackle box, and a pair of aligned bores are provided in the sidewalls of the sleeve for removably receiving a padlock member therethrough. The bolts, or the like, securing the sleeve to the support structure are concealed by the tackle box and the padlock, which is disposed within the tackle box, precludes removal of the tackle box from the sleeve as long as the padlock is in the locked position.

4 Claims, 4 Drawing Figures

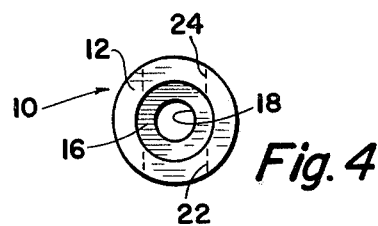
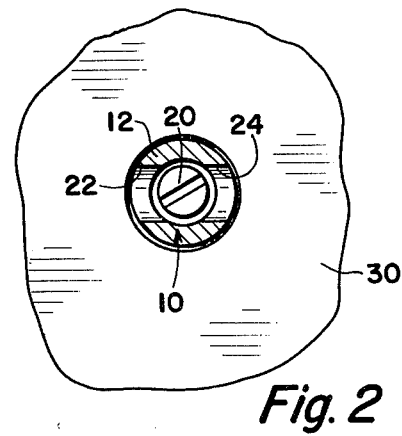
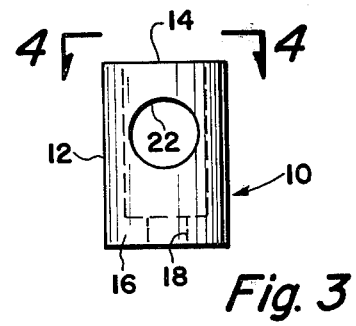
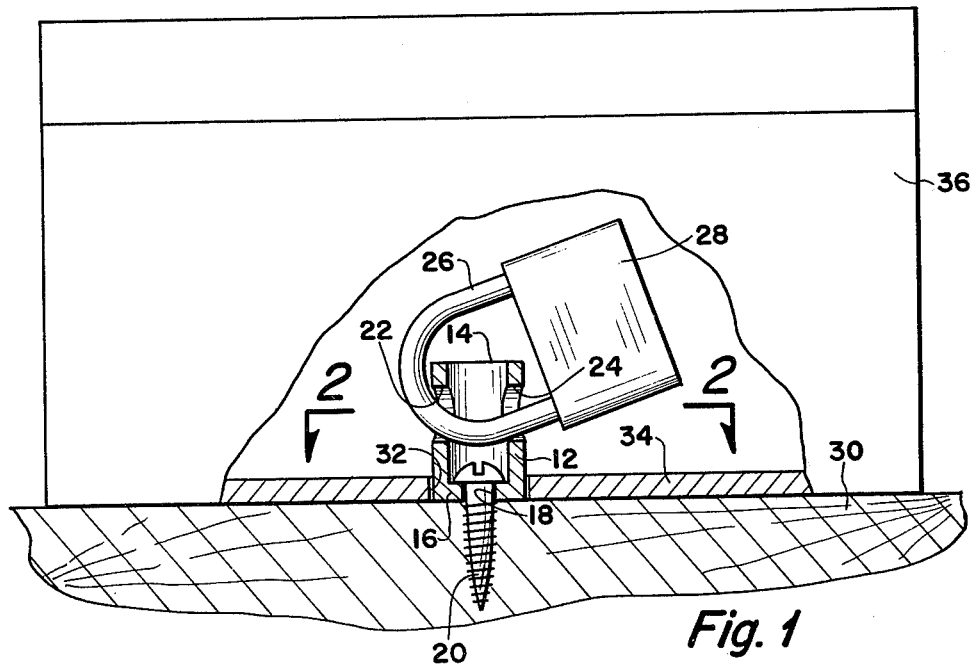

4,444,031

SECURITY DEVICE FOR TACKLE BOXES AND THE LIKE

CROSS REFERENCE TO RELATED APPLICATION

This application is an improvement of my co-pending application filed Oct. 14, 1980, and entitled SECURITY DEVICE FOR TACKLE BOXES AND THE LIKE.

BACKGROUND OF THE INVENTION

1. Field of the Invention

This invention relates to improvements in security devices and more particularly, but not by way of limitation, to a locking device for tackle boxes, and the like.

2. Description of the Prior Art

The great increase in theft in recent years has resulted in the loss of much valuable equipment, and the present day inflation factor has augmented the loss in that the value of merchandise has greatly increased. As a result, there is more and more demand for security devices for reducing the hazards of theft. For example, many fisherman today have been complaining of the fact that their tackle boxes have been stolen from their boats, and a fisherman frequently stores several hundred dollars worth of fishing paraphernalia in his tackle box. Thus, not only is the tackle box, which is expensive in and of itself a great loss, but also the contents of the box represent an additional loss. Of course, many tackle boxes are provided with locks in an effort to preclude opening of the box, but the general portable nature of tackle boxes, and the like, results in a theft of the entire tackle box whether locked or unlocked, since most locks can be broken off if sufficient time and isolation is available. In order to reduce the theft of tackle boxes, and the like, the security device shown in my aforementioned application was developed which efficiently and effectively solves the problem. It has been found, however, that the costs of manufacture of the device may result in an end pricing of the device which may deter some fisherman, or the like, from the purchase of the item.

SUMMARY OF THE INVENTION

The present invention contemplates a novel security device for tackle boxes and the like which has been particularly designed and constructed for overcoming the disadvantage of my prior security device and comprises a sleeve means having one open end and one closed end. The closed end is provided with an aperture for receiving bolt means therethrough whereby the closed end may be secured to a boat bottom, a floor, or any other substantially permanent support structure for receiving the tackle box, or the like, on the exposed surface thereof. The sleeve member extends outwardly from the exposed surface of the support member for insertion through a bore provided in the bottom of the tackle box. The design of some tackle boxes is such that a central opening is normally provided therein, but other boxes must be slightly altered by providing a suitable bore in the bottom thereof. The sleeve is provided with a pair of aligned bores in the sidewall thereof for receiving the bail member of a suitable locking device, such as a padlock, therethrough. The outer end of the sleeve member preferably terminates within the interior of the tackle box, and is spaced inboard of the bottom of the box. In this manner, the padlock is contained within the box, and since the box itself conceals the bolt which secures the sleeve to the support surface, the box is securely retained against movement as long as the padlock is in the locked position. Of course, the tackle box itself may be locked in the usual manner for controlling ready access to the interior thereof, and even if the box is not independently locked, the usual padlock is not readily broken and resists any quick retrieval of the box by any thieving action. The novel security device is simple and efficient in operation and economical and durable in construction.

BRIEF DESCRIPTION OF THE DRAWINGS

FIG. 1 is an elevational view of a tackle box secured to a support structure by a security device embodying the invention, with portions cut-away for purposes of illustration.

FIG. 2 is a view taken on line 2—2 of FIG. 1.

FIG. 3 is a side elevational view of a security device embodying the invention.

FIG. 4 is a view taken on line 4—4 of FIG. 3.

DETAILED DESCRIPTION OF THE PREFERRED EMBODIMENT

Referring to the drawings in detail, reference character 10 generally indicates a security device comprising a sleeve member 12 having one open end 14 and one end closed by a wall 16. The wall 16 is provided with a centrally disposed aperture 18 for receiving a suitable screw means 20, or the like, therethrough. The inner periphery of the sleeve 12 is preferably of a diameter sufficient for receiving a suitable tool, such as a screw driver (not shown), or the like, therethrough for manipulation of the screw means 20 as will be hereinafter set forth in detail.

A pair of substantially axially aligned bores 22 and 24 are provided in the sidewall of the sleeve 12, spaced inboard from the open end thereof for receiving the bail member 26 of a suitable lock, such as a padlock 28 therethrough.

In use, the device 10 is secured to a suitable support structure, such as the bottom 30 of a boat, by the screw means 20. The screw means 20 may be inserted through the open end 14 of the sleeve 12, and a screw driver (not shown) or the like may be utilized in the normal manner for fastening the screw means 20 into the support structure 30 as particularly shown in FIG. 1. The sleeve 12 extends upwardly or outwardly from the exposed surface of the support structure 30 for insertion through a bore 32 provided in the bottom 34 of a tackle box 36, or the like. (In some instances the bottom 34 of the tackle box 36 may be provided with a bore 32 centrally disposed therein. However, if the bottom 34 is solid, then it is necessary to provide a bore 32 therein in any suitable or well known manner.)

When the box 28 is placed on the exposed surface of the support structure 30, the sleeve 12 extends through the bore 32. As hereinbefore set forth, it is preferable that the outer end or open end 14 of the sleeve 12 terminate within the interior of the box 36, and preferably slightly inboard of the inner surface of the bottom 34 whereby the apertures 22 and 24 are readily accessible from the interior of the box 36. With the box 36 thus disposed on the outer or exposed surface of the support 30, the padlock 28 may be attached to the sleeve 12 by passing the bail member 26 thereof through the bores 22 and 24 in the usual or well known manner. This precludes lifting of the box 36 from the surface 30 since the padlock interferes with any upward movement of the bottom 34 along the outer periphery of the sleeve 12. In addition, the bottom of the box 36 obscures the location of the screw means 20 from view exteriorly of the secured box, thus precluding access to the screw in the closed position of the box 36. It will be readily apparent that the security device 10 thus secures the tackle box 36 against theft or other accidental loss thereof from the bottom or supporting surface 30.

Of course, substantially any desired article may be similarly secured against loss, such as a tool box carried in the normally open bed of a pick-up truck, or the like. Many security applications are available through the use of the device 10.

From the foregoing it will be apparent that the present invention provides a novel security device which may be bolted or otherwise secured to a support surface and extends into the interior of the item being secured thereby for receiving a suitable locking means to preclude longitudinally outward movement of the secured item along the outer periphery of the device as long as the locking means is secured thereto. The novel security device efficiently protects the item against loss by theft, or the like, and normally requires little alteration of the structure of the item being secured.

Whereas the present invention has been described in particular relation to the drawings attached hereto, it should be understood that other and further modifications, apart from those shown or suggested herein, may be made within the spirit and scope of this invention.

What is claimed is:

1. A security device for securing a container against accidental loss and comprising sleeve means adapted to be secured to a supporting structure for insertion into the interior of the container whereby the outer end of the sleeve means terminates within the interior of the container, locking means engagable with the portion of the sleeve means disposed within the container for precluding outward longitudinal movement of the container along the outer periphery of the sleeve means when the locking means is engaged with the sleeve means for securing the container against accidental loss, and wherein the sleeve means is provided with one open end and one closed end, said closed end being adapted for disposition against said supporting structure and provided with aperture means therein, and screw means insertable through the open end and through said aperture means for securing the sleeve means to said supporting structure.

2. A security device as set forth in claim 1 wherein the sleeve means is provided with an inner periphery having a diameter sufficiently great for facilitating securing of the screw means with the supporting structure.

3. A security device as set forth in claim 1 wherein the locking means is a padlock.

4. A security device as set forth in claim 3 wherein the sleeve means is provided with aperture means in the sidewall thereof for receiving the bail means of the padlock therethrough.

* * * * *